United States Patent Office 3,080,366
Patented Mar. 5, 1963

3,080,366
1-(ω,ω-DIPHENYLALKYL)-4-AMINO-4-PIPERIDINE-
CARBOXAMIDES AND DERIVATIVES THEREOF
Paul A. J. Janssen, Vooselaar, near Turnhout, Belgium,
assignor to Research Laboratorium Dr. C. Janssen,
N.V., Beerse, Belgium, a company of Belgium
No Drawing. Filed June 13, 1961, Ser. No. 116,683
10 Claims. (Cl. 260—247.2)

The present invention relates to compounds of the formula

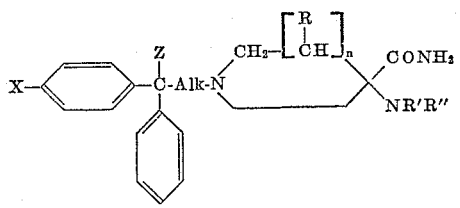

wherein Z represents hydrogen, cyano, carbamyl, hydroxy, or lower alkanoyloxy; Alk represents lower alkylene; $n$ is zero or one; R'R''N— is (lower alkyl)$_2$N—, morpholino, pyrrolidino, piperidino, hexamethylenimino, and their mono- and dimethyl substitution products; X represents hydrogen, halogen, or methoxy; and R is selected from the group consisting of hydrogen and methyl.

The lower alkyl, lower alkylene, and lower alkanoyloxy radicals referred to in the present application contain up to 6 carbon atoms. Typical examples of the lower alkyl radicals represented by R' and R'' are methyl, ethyl, propyl, isopropyl, butyl, isobutyl, sec-butyl, tert-butyl, pentyl, isopentyl, tert-pentyl, neo-pentyl, hexyl and isohexyl. Among the lower alkylene radicals represented by Alk are methylene ethylene, propylene, tetramethylene, pentamethylene, and hexamethylene. The halogens referred to above are fluorine, chlorine, bromine or iodine.

The organic bases of this invention form nontoxic, acid-addition salts with a variety of organic and inorganic acids. Such salts are formed with such acids as sulfuric, phosphoric, hydrochloric, hydrobromic, hydriodic, sulfamic, citric, lactic, maleic, malic, succinic, tartaric, cinnamic, acetic, benzoic, gluconic asorbic and related acids. They also form quaternary ammonium salts with a variety of organic esters of sulfuric hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methallyl bromide and crotyl bromide.

The compounds of the present invention are useful because of their valuable pharmacological properties. Specifically, they induce a morphine-like analgesic effect of long duration but lack toxic side reactions which seriously limit the applicability of morphine.

To prepare the compounds of the present invention, an N-benzylated 3-pyrrolidone or 4-piperidone is treated with a source of cyanide ion and a secondary amine. The resultant α-aminonitrile is hydrolyzed to the carbamyl derivative and the amide is debenzylated by catalytic hydrogenolysis; the side chain is introduced by condensation with a substituted ω,ω-diphenylalkyl halide. Typically, the above reactions can be represented by the following equations:

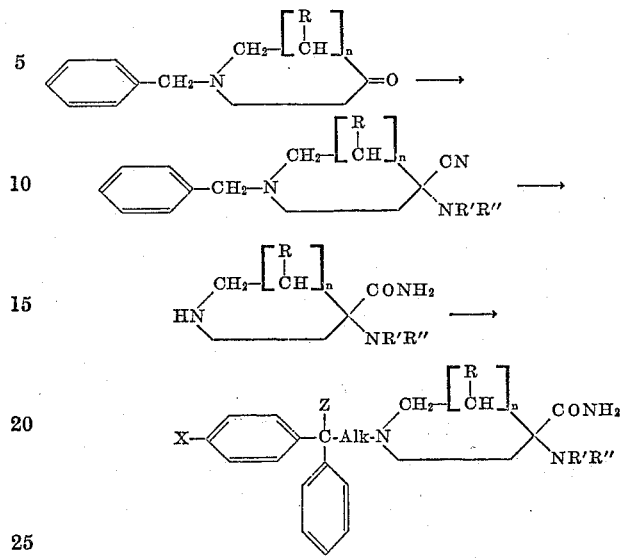

R, R', R'', $n$, X, Z, and Alk have the values indicated above. Embodiments in which Z is a carbamyl group can also be prepared by controlled hydrolysis of the corresponding cyano derivatives.

Conversion of the amine bases of this invention to corresponding acid addition salts is accomplished by simple admixture of these compounds with one or two equivalents of any of various inorganic and strong organic acids.

The following examples describe in detail certain of the compounds illustrative of the present invention and methods which have been devised for their manufacture. However, the invention is not to be construed as limited thereby either in spirit or in scope since it will be apparent to those skilled in the art of organic synthesis that many modifications of materials and of methods may be practiced without departing from the purpose and intent of this disclosure. In the examples hereinafter detailed temperatures are given in degrees centigrade (° C.), and relative amounts of materials in parts by weight except as otherwise noted.

The present invention is a continuation-in-part of the prior copending application, Serial No. 47,137, filed August 3, 1960, now abandoned.

EXAMPLE 1

*1-(3,3-Diphenyl-3-Cyanopropyl)-4-Piperidino-4-Piperidinecarboxamide*

To a stirred solution of 130 parts of potassium cyanide and 243 parts of piperidine hydrochloride in 800 parts of water and 320 parts of ethanol is added slowly 378 parts of N-benzyl-4-piperidone. The resultant mixture is stirred at room temperature for 24 hours; a precipitate is apparent after one hour. The reaction mixture is subjected to filtration, and the solid material thus obtained is recrystallized from 1200 parts of diisopropyl ether. The 1-benzyl-4-cyano-4-(N-piperidino)piperidine prepared in this way melts at 104–106° C.

A mixture of 141 parts of 1-benzyl-4-cyano-4-piperidinopiperidine and 400 parts of 90% sulfuric acid is heated at about 100° for 10 minutes; heating is discontinued, and the mixture is stirred for about one hour. The resultant mixture is poured into 1500 parts of ice water, and the solution thus obtained is rendered alkaline with ammonium hydroxide; an oil forms. The aqueous layer is decanted from the oil, and 800 parts of acetone is added. The resultant solid material is removed by filtration, and dried in air to give 1-benzyl-4-piperidino-4-piperidinecarboxamide, melting at 138–140° C.

A mixture of 215 parts of 1-benzyl-4-piperidino-4-piperidinecarboxamide, 40 parts of 10% palladium-on-charcoal, 1200 parts of isopropyl alcohol, 1000 parts of water and 157 parts of hydrochloric acid is subjected to treatment with hydrogen at atmospheric pressure at 40°. After the stoichiometric quantity of hydrogen required for the debenzylation is taken up, the reaction mixture is subjected to filtration, and the filtrate is evaporated to dryness. The residue is taken up in a mixture of 80 parts of acetone and 80 parts of benzene, and the resultant solution is evaporated to dryness. The residue is triturated with 200 parts of methanol, and the resultant mixture is filtered, to give 4-piperidino-4-piperidinecarboxamide dihydrochloride, melting at 299–301° C., with decomposition. To a solution of 200 parts of the dihydrochloride in 300 parts of water is added 150 parts of a 44% aqueous sodium hydroxide solution, and the resultant mixture is stirred for a short time. The suspension which results is subjected to filtration, and the solid material thus obtained is extracted with toluene in a Soxhlet extractor overnight. The resultant toluene solution is reduced in volume until a precipitate forms. The solid material thus obtained is removed by filtration to give 4-piperidino-4-piperidinecarboxamide, melting at about 119–120° C.

A mixture of 84 parts of 3,3-diphenyl-3-cyanopropyl bromide, 41 parts of 4-piperidino-4-piperidinecarboxamide, 64 parts of sodium carbonate, a small amount of potassium iodide and 1200 parts of anhydrous toluene is stirred, and heated under reflux for 48 hours. At the end of this time the reaction mixture is allowed to cool to room temperature, and 500 parts of water is added. The resultant precipitate is removed by filtration, and triturated with diisopropyl ether. The crystalline material thus obtained is removed by filtration, and recrystallized from 320 parts of acetone, to give 1-(3,3-diphenyl - 3 - cyanopropyl) - 4 - piperidino - 4-piperidinecarboxamide, melting at about 149–150° C. It has the structural formula

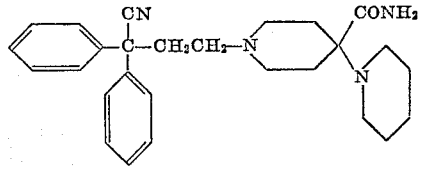

Salts of 1-(3,3-diphenyl-3-cyanopropyl)-4-piperidino-4-piperidinecarboxamide can be obtained by mixing a solution of the free amine with the appropriate compound. In the case of salts with compounds such as benzyl chloride and methyl iodide, refluxing in an inert solvent is desirable. The following salts were obtained in this way:

Dihydrochloride melting at about 286.5–289° C. with decomposition.
Dihydrobromide melting at about 313–317° C.
Methiodide melting at about 231.6–235.8° C.
Ditartrate melting at about 86–110° C. with decomposition.
Benzyl chloride melting at about 253.5–254.5° C.

EXAMPLE 2

*1-(3,3-Diphenyl-3-Carbamylpropyl)-4-Piperidino-4-Piperidinecarboxamide*

A mixture of 35 parts of 1-(3,3-diphenyl-3-cyanopropyl)-4-piperidino-4-piperidine-carboxamide and 600 parts of 90% sulfuric acid is heated at about 100° for 3 hours. The resultant mixture is allowed to cool to about 50°, and then poured into excess ice-cold ammonium hydroxide. The precipitate which forms is removed by filtration, and then taken up in chloroform. The chloroform solution is extracted with water; the organic layer is dried over anhydrous potassium carbonate, and evaporated to dryness. The residue is washed with diisopropyl ether, and dried in air to give 1 - (3,3 - diphenyl - 3 - carbamylpropyl) - 4 - piperidino-4-piperidinecarboxamide, melting at about 215–218° C. The structure can be expressed as

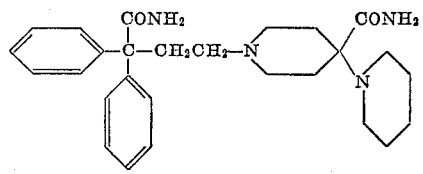

EXAMPLE 3

*1-(3,3-Diphenyl - 3 - Hydroxypropyl) - 4-Piperidino - 4-Piperidinecarboxamide*

A solution of phenylmagnesium bromide is prepared from 6 parts of magnesium and 40 parts of bromobenzene in 160 parts of ether and refluxed for 2 hours. A solution of 29 parts of β-chloropropiophenone in 400 parts of anhydrous ether is added portionwise and the mixture is refluxed for 6 hours. The reaction mixture is decomposed by the addition of 10% ammonium chloride solution while the temperature is maintained below 10° C. The ether solution is decanted, washed with water and dried and the solvent is evaporated. The residue solidified on standing. It is dissolved in a mixture of petroleum ether and acetone and the solvent is evaporated to give 3,3-diphenyl-3-hydroxypropyl chloride melting at about 77.4–78.6° C.

Substitution of 69 parts of 3,3-diphenyl-3-hydroxypropyl chloride for the 3,3-diphenyl-3-cyanopropyl bromide of Example 1 gives, by the procedure therein detailed, 1-(3,3-diphenyl - 3-hydroxypropyl)-4-piperidino-4-piperidinecarboxamide, melting at 188–190° C. The structure can be expressed as

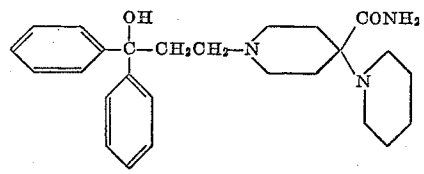

A mixture of 4.5 parts of 1-(3,3-diphenyl-3-hydroxypropyl)-4-piperidino - 4-piperidinecarboxamide, 20 parts of acetic anhydride, and 80 parts of anhydrous benzene is stirred and refluxed for 3.5 hours. The solvent is evaporated and the residue is dissolved in 100 parts of water. After the aquous solution is neutralized with potassium carbonate, it is extracted with ether. The ether solution is separated and dried over anhydrous potassium carbonate. Introduction of hydrogen chloride in the dried solution precipitates the hydrochloride which is recrystallized twice from a mixture of 2-propanol, acetone and water to give 1-(3,3-diphenyl-3-acetoxypropyl)-4-piperidino-4 - piperidinocarboxamide dihydrochloride melting at about 260–260.6° C.

EXAMPLE 4

*1-(3,3-Diphenylpropyl)-4-Piperidino-4-Piperidinecarboxamide*

Substitution of 77 parts of 3,3-diphenylpropyl bromide for the 3,3-diphenyl-3-cyanopropyl bromide of Example 1 gives, by the procedure therein detailed, 1-(3,3-diphenylpropyl)-4-piperidino-4-piperidinecarboxamide, melting at about 131–132° C. The structure can be expressed as

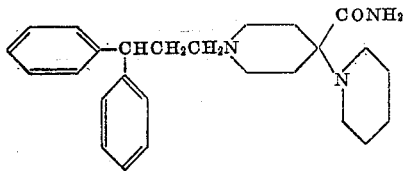

EXAMPLE 5

*1-(3,3-Diphenyl-3-Cyanopropyl)-4-Morpholino-4-Piperidinecarboxamide*

Substitution of 248 parts of morpholine hydrochloride for the piperidine hydrochloride of Example 1 gives, by the procedure therein detailed, successively 1-benzyl-4-cyano-4-morpholinopiperidine, melting at about 117–118° C.; 1-benzyl-4-morpholino-4-piperidinecarboxamide, melting at about 150–151° C.; 4-morpholino-4-piperidinecarboxamide, melting at 183–187° C.; and 1-(3,3-diphenyl-3-cyanopropyl)-4 - morpholino-4 - piperidinecarboxamide, melting at about 203–204° C.

EXAMPLE 6

*1-(3,3-Diphenyl-3-Cyanopropyl) - 4 - (1-Pyrrolidinyl)-4-Piperidinecarboxamide*

Substitution of 212 parts of pyrrolidine hydrochloride for the piperidine hydrochloride of Example 1 gives, by the procedure therein detailed, successively 1-benzyl-4-cyano-4-(1-pyrrolidinyl)piperidine, melting at about 87–88° C; 1-benzyl-4-(1-pyrrolidinyl)-4 - piperidinecarboxamide, melting at 124–127° C.; 4-(1-pyrrolidinyl)-4-piperidinecarboxamide, melting at about 141–142° C.; and 1-(3,3-diphenyl-3-cyanopropyl)-4-(1-pyrrolidinyl)-4-piperidinecarboxamide, melting at about 159–160° C.

EXAMPLE 7

*1-(3,3-Diphenyl-3-Cyanopropyl) - 4-Hexamethylenimino-4-Piperidinecarboxamide*

To a cooled solution of 37.9 parts of N-benzyl-4-piperidone there is added a solution of 40.6 parts of sodium bisulfite and 80 parts of water. The mixture is cooled and stirred vigorously for 30 minutes before 24 parts of hexamethylenimine is added portionwise. Stirring is continued for 15 hours at room temperature before 13 parts of potassium cyanide is added and the resultant mixture is stirred for 2 hours at room temperature and then 1 hour at 50–60° C. 100 parts of water is added to the mixture and the aqueous solution is extracted twice with 1120 parts of ether and once with 600 parts of chloroform. The combined organic layers are dried over potassium carbonate and hydrogen chloride gas is introduced to precipitate 1-benzyl-4-cyano-4-hexamethyleniminopiperidine hydrochloride melting at about 139–149° C. Substitution of 1-benzyl-4-cyano-4-hexamethyleniminopiperidine hydrochloride for the 1-benzyl-4-cyano-4-piperidinopiperidine of Example 1 gives by the procedure therein detailed successively 1-benzyl-4-hexamethylenimino-4-piperidinecarboxamide, melting at about 110–111° C.; 4-hexamethylenimino-4-piperidinecarboxamide melting at about 111–118° C.; and 1-(3,3-diphenyl-3-cyanopropyl)-4-hexamethylenimino-4 - piperidinecarboxamide dihydrochloride, melting at about 289–291.2° C. In this case the dihydrochloride of the final product is obtained by passing hydrogen chloride gas through an ether solution of the free base. The crude hydrochloride is purified by recrystallization from water.

EXAMPLE 8

*1-(3,3-Diphenyl-3-Cyanopropyl)-4-Dimethylamino-4-Piperidinecarboxamide Dihydrochloride*

Substitution of 184 parts of dimethylamine hydrochloride for the piperidine hydrochloride of Example 1 gives, by the procedure therein detailed, successively 1-benzyl-4-cyano-4-dimethylaminopiperidine, melting at 107–109° C.; 1-benzyl-4-dimethylamino-4-piperidinecarboxamide, melting at 122–124° C.; 4-dimethylamino-4-piperidinecarboxamide, melting at 118–121° C.; and 1-(3,3-diphenyl-3-cyanopropyl) - 4 - dimethylamino-4-piperadinecarboxamide. The last-named compound is taken up in ether, and the resultant solution is saturated with hydrogen chloride gas. The precipitate which forms is removed by filtration, and then recrystallized from a mixture of acetone and isopropyl alcohol to give 1-(3,3-diphenyl-3-cyanopropyl) - 4 - dimethylamino - 4 - piperidinecarboxamide dihydrochloride, melting at about 270–271° C., with decomposition.

EXAMPLE 9

*1-(3,3-Diphenyl-3-Cyanopropyl)-4-Diethylamino-4-Piperidinecarboxamide*

Substitution of 247 parts of diethylamine hydrochloride for the piperidine hydrochloride of Example 1 gives, by the procedure therein detailed, successively 1-benzyl-4-cyano - 4 - diethylaminopiperidine, 1-benzyl-4-diethylamino - 4 - piperidinecarboxamide, 4 - diethylamino - 4-piperidinecarboxamide and 1 - (3,3 - diphenyl-3-cyanopropyl)-4-diethylamino-4-piperidinecarboxamide.

EXAMPLE 10

*1-(3,3-Diphenyl-3-Cyanopropyl)-4-Dibutylamino-4-Piperidinecarboxamide*

Substitution of 365 parts of dibutylamine hydrochloride for the piperidine hydrochloride of Example 1 gives, by the procedure therein detailed, successively 1-benzyl-4-cyano-4-dibutylaminopiperidine, 1-benzyl-4-dibutylamino-4-piperidinecarboxamide, 4-dibutylamino-4-piperidinecarboxamide, and 1-(3,3-diphenyl-3-cyanopropyl)-4-dibutylamino-4-piperidinecarboxamide. The structure of the final product may be expressed as

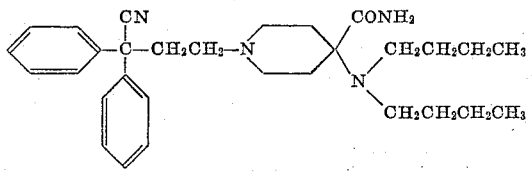

EXAMPLE 11

*1-(4,4-Diphenyl-4-Cyanobutyl)-4-Piperidino-4-Piperidinecarboxamide*

A mixture of 6.6 parts of 4,4-diphenyl-4-cyanobutyl bromide, 8.4 parts of 4-piperidino-4-piperidinecarboxamide, and 0.1 part of potassium iodide in 120 parts of toluene is heated in a sealed tube for 100 hours at 110° C. The cooled mixture is filtered and the filtrate is diluted with 480 parts of ether. The precipitated solvent is filtered and dried to give 1-(4,4-diphenyl-4-cyanobutyl)-4-piperidino-4-piperidinecarboxamide, melting at about 187–188° C.

EXAMPLE 12

*1-(6,6-Diphenyl-6-Cyanohexyl)-4-Piperidino-4-Piperidinecarboxamide*

Substitution of 96 parts of 6,6-diphenyl-6-cyanohexyl bromide for the 3,3-diphenyl-3-cyanopropyl bromide of Example 1 gives, by the procedure therein detailed, 1-(6,6 - diphenyl - 6 - cyanohexyl)-4-piperidino-4-piperidinecarboxamide. The structure may be expressed as

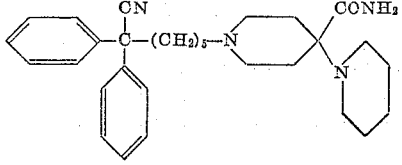

EXAMPLE 13

1-(3,3-Diphenyl-3-Cyanopropyl)-3-Piperidino-3-Pyrrolidinecarboxamide Dihydrochloride Substitution of 350 parts of 1-benzyl-3-pyrrolidone for the 1-benzyl-4-piperidone of Example 1 gives, by the procedure therein detailed, successively 1-benzyl-3-cyano-3-piperidinopyrrolidine, boiling at 135° C./0.3 mm.; 1-benzyl-3-piperidino-3-pyrrolidinecarboxamide, melting at about 85–86° C.; 3-piperidino-3-pyrrolidinecarboxamide, melting at 155–157° C.; and 1 - (3,3-diphenyl-3-cyanopropyl)-3-piperidino-3-pyrrolidinecarboxamide. The last-named compound is taken up in ether, and the resultant solution is saturated with hydrogen chloride gas. The precipitate which forms is removed by filtration, and recrystallized from a mixture of methanol and acetone to give 1 - (3,3-diphenyl-3-cyanopropyl)-3-piperidino-3-pyrrolidinecarboxamide dihydrochloride, melting at 257–267° C., with decomposition.

EXAMPLE 14

1-(3,3-Diphenyl-3-Cyanopropyl)-3-Methyl-4-Piperidino-4-Piperidinecarboxamide To a cooled solution of 101.5 parts of 1-benzyl-3-methyl-4-piperidine in 215 parts of 15% hydrochloric acid is added a solution of 50 parts of sodium cyanide in 130 parts of water. The mixture is stirred overnight at room temperature before it is alkalized with ammonium hydroxide solution and extracted with 2 portions of benzene. The solvent is evaporated from the dried organic layer and the residue is dissolved in 800 parts of diisopropyl ether and hydrogen chloride gas is introduced. The precipitated hydrochloride is recrystallized from butanone to give 1-benzyl-3-methyl-4-hydroxy-4-cyanopiperidine hydrochloride, melting at about 171–173° C. A mixture of 57 parts of this hydrochloride, 55.5 parts of piperidine, and 132 parts of methanol is stirred and refluxed for 16 hours. The solvent is evaporated from the reaction mixture and the residue is dissolved in 300 parts of water and extracted twice with benzene. The benzene layer is washed twice with 50 parts of water, dried over potassium carbonate and the solvent is evaporated. The residue is dissolved in 560 parts of diisopropyl ether and hydrogen chloride gas is introduced into the solution. The precipitated hydrochloride is stirred in 160 parts of acetone at 45° C. to give 1 - benzyl-3-methyl-4-cyano-4-piperidinopiperidine dihydrochloride, melting at about 145–163° C.

By substituting an equivalent quantity of 1-benzyl-3-methyl-4-cyano-4-piperidinopiperidine dihydrochloride for the 1-benzyl-4-cyano-4-piperidinopiperidine of Example 1 and following the procedure therein detailed, there is obtained successively 1-benzyl-3-methyl-4-piperidino-4-piperidinecarboxamide, melting at about 136–137° C.; 3-methyl-4-piperidino-4-piperidinecarboxamide melting at about 144–145° C.; and 1-(3,3-diphenyl-3-cyanopropyl)-3-methyl-4-piperidino-4-piperidinecarboxamide, melting at about 177–178° C.

EXAMPLE 15

A mixture of 8 parts of sodamide and 42 parts of 4-fluorodiphenylacetonitrile in 320 parts of anhydrous benzene is refluxed for 2.5 hours. The mixture is cooled to 0° C., and 90 parts of ethylene bromide is added. The reaction mixture is warmed slowly to room temperature. When the exothermic reaction has subsided, the mixture is refluxed for 3.5 hours. The mixture is then cooled and decomposed by the addition of water. The benzene layer is separated, washed with water and dried over potassium carbonate, and the solvent is evaporated. The residue is recrystallized from 2-propanol to give 3-phenyl-3-(4-fluorophenyl)-3-cyanopropyl bromide melting at about 40–41° C.

If equivalent quantities of the appropriate substituted diphenylacetonitrile are substituted for the 4-fluorodiphenylacetonitrile in the above procedure, the following compounds are obtained as oils and used in the next step without further purification.

3-phenyl-3-(4-chlorophenyl)-3-cyanopropyl bromide.
3-phenyl-3-(4-methoxyphenyl)-3-cyanopropyl bromide.
3-phenyl-3-(4-bromophenyl)-3-cyanopropyl bromide.

EXAMPLE 16

A mixture of 40 parts of 3-phenyl-3-(4-methoxyphenyl)-3-cyanopropyl bromide, 25 parts of 4-piperidino-4-piperidinecarboxamide, 50 parts of sodium carbonate, and 0.1 part of potassium iodide in 480 parts of 4-methyl-2-pentanone is stirred and refluxed for 86 hours. The cooled reaction mixture is filtered and the solvent is evaporated from the filtrate. The residue is recrystallized from a mixture of benzene and ether to give 1-[3-phenyl-3-(4-methoxyphenyl)-3-cyanopropyl]-4-piperidino-4-piperidinecarboxamide melting at about 178.6–179.4° C.

If an equivalent quantity of the appropriately substituted cyanopropyl bromide is substituted for the 3-phenyl-3-(4-methoxyphenyl)-3-cyanopropyl bromide and the above procedure is repeated, the following compounds are obtained:

1-[3-phenyl-3-(4-chlorophenyl)-3-cyanopropyl]-4-piperidino-4-piperidinecarboxamide melting at about 148–150° C.

1-[3-phenyl-3-(4-fluorophenyl)-3-cyanopropyl]-4-piperidino-4-piperidinecarboxamide melting at about 121–122° C.

1-[3-phenyl-3-(4-bromophenyl)-3-cyanopropyl]-4-piperidinecarboxamide.

What is claimed is:

1. A compound of the formula

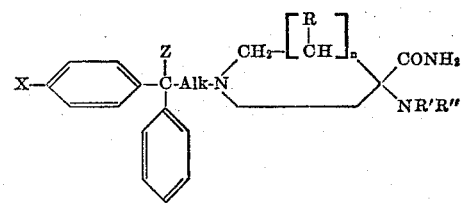

wherein Z is a member of the class consisting of hydrogen, cyano, carbamyl, hydroxy, and (lower alkanoyl)oxy; Alk is lower alkylene; $n$ is an integer between 0 and 1 inclusive; X is a member of the class consisting of hydrogen, methoxy, and halogen; R is a member of the class consisting of hydrogen and methyl; and R'R''N— is a member of the class consisting of (lower alkyl)$_2$N—, morpholino, and YN—, wherein Y is lower alkylene with at least 4 carbon atoms in the nuclear position, said lower alkanoyl, lower alkylene and lower alkyl containing up to six carbon atoms.

2. 1-(3,3-diphenylpropyl)-4-piperidino-4-piperidinecarboxamide.

3. 1-(3,3 - diphenyl - 3 - cyanopropyl)-4-morpholino-4-piperidinecarboxamide.

4. 1-(3,3-diphenyl-3-cyanopropyl)-4-piperidino-4-piperidinecarboxamide.

5. 1-(3,3-diphenyl-3-carbamylpropyl)-4-piperidino-4-piperidinecarboxamide.

6. 1-(3,3 - diphenyl-3-hydroxypropyl)-4-piperidino-4-piperidinecarboxamide.

7. 1-(3,3-diphenyl-3-cyanopropyl)-4-dimethylamino-4-piperidinecarboxamide.

8. 1-(3,3-diphenyl-3-cyanopropyl)-4-(1-pyrrolidinyl)-4-piperidinecarboxamide.

9. 1-(3,3-diphenyl-3-cyanopropyl)-3-piperidino-3-pyrrolidinecarboxamide.

10. 1-[3-phenyl-3-(4-fluorophenyl)-3-cyanopropyl]-4-piperidino-4-piperidinecarboxamide.

No references cited.